United States Patent Office 3,530,084
Patented Sept. 22, 1970

3,530,084
PROCESS FOR MAKING ETHYLENE-VINYL ACETATE COPOLYMERS OF LOW MELT INDEX, AND WAX COMPOSITIONS CONTAINING THE COPOLYMERS
James E. Potts, West Millington, N.J., assignor to Union Carbide Corporation, a corporation of New York
No Drawing. Filed Jan. 18, 1967, Ser. No. 610,033
Int. Cl. C08c 11/70; C08f 1/16
U.S. Cl. 260—28.5                          2 Claims

ABSTRACT OF THE DISCLOSURE

Application of ionizing radiation in a dose between 0.5 and 1.5 megareps to copolymers of ethylene and vinyl acetate lowers the melt index and increases the toughness and flexibility of the copolymers without substantially decreasing solubility or thermoplasticity. The increased toughness and flexibility carries over into blends with wax or polyethylene.

---

Copolymers of ethylene and vinyl acetate containing 15% or more, usually 20% to 30% by weight, vinyl acetate are useful molding materials. They are used, for instance, instead of vulcanized rubber in applications which require good flexibility and good low-temperature properties but not a rubberlike resiliency. Being completely thermoplastic with a high permanent elongation, they are easier to fabricate than a vulcanized product, yet they are more flexible and extensible than homopolymers of either ethylene or vinyl acetate.

These copolymers are also useful as wax additives to increase the toughness and lower the moisture vapor transmission of wax coatings on paper, paperboard, and foil. For such applications, the low melt index resins are much preferred, generally in proportions of about 0.05 to 1 part by weight of copolymer per part of paraffin or petroleum wax. Greater amounts of copolymer provide excellent hot melt adhesive compositions where high lamination strength is necessary.

For any given composition of these copolymers, the best toughness and strength is obtained at high molecular weight evidenced by a melt index at 190° C. under 5 and preferably 0.1 to 3 decigrams per minute. However, it is difficult and expensive to produce copolymers in this range. Higher pressures, lower temperatures, and longer times at polymerizing temperatures must be used and consequently conversions are lower, and there is a strong tendency for localized cross-linking, producing gel specks ("fisheyes") and also local degradation. Within this lower melt index range, best flexibility is obtained at the higher percentages of vinyl acetate, but this ingredient also is the most expensive one and the most difficult to control in interpolymerization to a low melt index. On the other hand, it is relatively easy to achieve a melt index of 10 or more by direct interpolymerization methods that are not expensive.

It has been proposed (British Pat. 901,117, Farbenfabriken Bayer Aktiengesellschaft) to convert these copolymers to cross-linked rubberlike materials, having good extensibility and low permanent elongation, by a vulcanizing dose of ionizing radiation. The resulting cross-linking destroys the thermoplasticity of the copolymer, and also lowers its solubility, thus changing its fields of use and making the polymer insoluble in waxes and nearly impossible to extrude and form by conventional means.

It has now been found that by the application of ionizing radiation at relatively light dosages to the more cheaply and easily made ethylene-vinyl acetate copolymers containing 15% or more combined vinyl acetate and of average melt index above 5 decigrams per minute, at 190° C., it is now possible to lower this melt index to below 5 and even to the range of 0.1 to 1 without converting the material to an elastomer, i.e., without destroying its thermoplasticity, decreasing its solubility, or producing measurable amounts of cross-linked resin. It has also been found that at a given melt index under 5 and a given vinyl acetate content, the irradiated copolymer made in this way is not only as flexible as one of substantially higher vinyl acetate content polymerized directly to this melt index but also produces surprisingly superior properties in the wax blends.

The copolymer may be irradiated when molten, e.g., as it emerges from an extruder, or when solid in the form of a film, fiber, web, powder, or pellets. The latter method of irradiation is preferred for convenience and simplicity. Any suitable apparatus or treating device can be used as long as it evenly exposes the copolymer to the high energy irradiation without localized overexposure that could cause cross-linking or gel formation.

The source and type of high energy ionizing radiation is not critical. Gamma rays, X-rays, beta radiation, protons, deutrons, and alpha particles may all be used. In the specific examples mentioned herein, there was used cathode emission from a Van de Graaff electron accelerator described by F. L. Foster et al. in "Nucleonics," October 1953, vol. 11, No. 10, at pages 14–17 (McGraw-Hill Publishing Co., Inc., New York).

The dosage required in this process will fall in the range of 0.5 to 1.6 megareps (a megarep being $83.8 \times 10^6$ ergs per gram of material radiated) but commensurate with the initial melt index of the polymer. Typical effects on melt index of representative copolymers of various vinyl acetate content, using various dosages within this range are demonstrated in the following Table A:

TABLE A

| Percent vinal acetate | Initial melt index, dg./min. | Dosage, megareps | Final melt index, dg./min. |
|---|---|---|---|
| 25 | 26.2 | 1.12 | 1.66 |
| 20 | 20.0 | 1.50 | 2.25 |
| 25 | 17.4 | 0.765 | 1.90 |
| 25 | 17.4 | 1.00 | 1.04 |
| 25 | 17.4 | 1.28 | 0.75 |
| 25 | 17.4 | 1.38 | 0.49 |
| 25 | 17.4 | 1.60 | 0.30 |
| 28 | 17.0 | 1.00 | 2.90 |
| 28 | 17.0 | 1.25 | 2.20 |
| 28 | 17.0 | 1.60 | 1.20 |
| 28 | 13.6 | 1.00 | 1.00 |
| 29 | 13.4 | 0.78 | 1.04 |
| 29 | 13.4 | 0.85 | 0.78 |
| 29 | 13.4 | 1.15 | 0.43 |
| 28 | 5.71 | 0.75 | 0.75 |

All of the irradiated materials in Table A are fully thermoplastic and completely soluble in hot ethyl acetate, in hot carbon tetrachloride, and in hot toluene. It can be seen that copolymers having an initial melt index from 5 to 30 are readily converted by the invention to copolymers of melt index below 3. In all cases, however, the irradiation must be less than that causing cross-linking or gel specks in the copolymer. This maximum irradiation dose is of course quite dependent on the initial melt index or molecular weight of the polymer. The selected dose will depend primarily on the desired melt index of the resin. Naturally, the higher melt index resins have a greater tolerance to higher radiation doses than do the lower melt index resins.

Further illustrating the invention, an ethylene-vinyl acetate copolymer containing 20% vinyl acetate by weight and an average melt index of 20 decigrams per minute was irradiated in pellet form with a dose of 1.5 megarep, producing a material of average melt index 2.25 decigrams per minute. The resulting irradiated material, hereinafter referred to as "copolymer A" was blended with 12.5 parts by weight each of a commercial untraviolet stabilizer (dialkyl hydroxyphenylbenzotriazole marketed by Geigy Industrial Chemicals Co. as "Tinuvin" 327) and a commercial antioxidant (Geigy's "Irganox" 1093) to 2475 parts of copolymer A. For comparison purposes, an otherwise identical blend was prepared from a 20% vinyl acetate-ethylene copolymer of melt index at 190° C. of 2.06 decigrams per minute, prepared by polymerization directly to this melt index (Control Copolymer B). Plastic films were extruded from these blends using a tubular film die and identical extrusion conditions. The physical properties of the films were determined to be as follows:

TABLE B

|  | Copolymer A blend | Control copolymer B blend |
|---|---|---|
| Elongation: |  |  |
| Machine direction, percent | 612 | 644 |
| Transverse direction, percent | 600 | 636 |
| Secant (stiffness) modulus: |  |  |
| Machine direction, p.s.i | 3,889 | 7,015 |
| Transverse direction, p.s.i | 4,072 | 7,173 |
| Light transmission, percent | 91.7 | 90 |

The lower modulus of copolymer A is a measure of its greater flexibility. To obtain this lower modulus by direct polymerization to melt index of about 2 would require a substantial increase in the content of vinyl acetate.

Another blend of copolymer A included, for each 2475 parts by weight of copolymer A, 12.5 parts each of the same ultraviolet stabilizer and antioxidant, 2.5 parts by weight of a commercial antiblock agent (70% stearamide-30% palmitamide mixture marketed by General Mills, Inc. as "Alamide" H-26) and 250 parts by weight of a blend of 80% copolymer B with 20% highly divided silica ("Superfloss"). For comparison, an otherwise identical blend was made using copolymer B. Again, plastic films were prepared using a tubular film die and identical extrusion conditions. The physical properties were determined to be:

TABLE C

|  | Copolymer A blend | Control copolymer B blend |
|---|---|---|
| Elongation: |  |  |
| Machine direction, percent | 622 | 642 |
| Transverse direction, percent | 622 | 624 |
| Secant (stiffness) modulus: |  |  |
| Machine direction, p.s.i | 5,023 | 7,628 |
| Transverse direction, p.s.i | 4,467 | 7,919 |
| Light transmission, percent | 90 | 89.4 |

The following data illustrates typical properties of the copolymers made according to this invention at various contents of vinyl acetate and various melt indices:

TABLE D

|  | Avg. tensile strength, p.s.i. | Percent elongation | Elastic modulus, p.s.i. |
|---|---|---|---|
| 20% Vinyl acetate, 2.25 melt index | 2,622 | 606 | 3,980 |
| 26.4% Vinyl acetate, 1.09 melt index | 1,515 | 745 | 2,219 |
| 29.5% Vinyl acetate, 1.67 melt index | 1,809 | 817 | 2,324 |

The greater flexibility of copolymers treated according to this invention gives greater flexibility in blends with, for instance, polyethylene. For example, a polyethylene blend was prepared from 862.5 parts by weight of polyethylene (0.92 density, 0.4 melt index); 25 parts titanium dioxide; 12.5 parts each of ultraviolet stabilizer ("Tinuvin" 327), antioxidant ("Irganox" 1093); 25 parts antiblock agent ("Alamide" H-26); and 26 parts finely divided silica ("Superfloss"), fluxed together in a Banbury blender, sheeted on a 2-roll mill, and granulated. Blends were made of 38% of the foregoing with 62% of respectively, copolymer A of the invention and control copolymer B for comparison. Plaques compression molded from these blends had, respectively, the following properties:

TABLE E

|  | Blend of copolymer A | Control blend of copolymer B |
|---|---|---|
| Melt index, 190° C., 44 p.s.i | 1.20 | 1.66 |
| Elongation, percent | 720 | 720 |
| Secant (stiffness) modulus, p.s.i. | 9,950 | 13,200 |

Films were blown from these two polyethylene-copolymer blends using a circular film die and identical blowing conditions. The film properties were:

TABLE F

|  | Blend of copolymer A | Control blend of copolymer B |
|---|---|---|
| Elongation: |  |  |
| Machine direction, percent | 596 | 612 |
| Transverse direction, percent | 560 | 602 |
| Secant (stiffness) modulus: |  |  |
| Machine direction, p.s.i | 9,800 | 13,200 |
| Transverse direction, p.s.i | 9,500 | 12,930 |

The greater flexibility of copolymers made according to this invention also gives surprisingly greater flexibility in blends with petroleum waxes or paraffin. For instance, blends of 70% petroleum wax (Atlantic Refining Co. Wax No. 1116) with 30% of ethylene-vinyl acetate copolymers containing 28% vinyl acetate, an initial melt index of 17 decigrams per minute and dosages of ionizing radiation of respectively 0, 1, 1.25, and 1.6 were molded into test strips two inches long, one-half inch wide, and 0.05 inch thick. The test strips were flexed 90° at 28 cycles per minute until failure, with the following results:

TABLE G

| Dosage, megareps | Final melt index dg./min. | Average life, flex cycles |
|---|---|---|
| 0 | 17 | 280±30 |
| 1 | 2.9 | 660±20 |
| 1.25 | 2.2 | 700 |
| 1.60 | 1.2 | 900±20 |

All of these copolymers were completely soluble in molten paraffin wax and were completely thermoplastic.

A much more rigorous test consists in injection molding samples to 0.070 inch thick, cutting to strips one-half inch by one and five-eighth inch, clamping five-eighth inch of one end with a force of six inch-pounds, and bending the protruding end 90° first in one direction and then in the other over a one and one-half inch idling roller at a rate of thirty cycles a minute. Clearance between the jig holding the sample strip and the top of the roller is five-sixteenth inch. Tests conducted at 25° C. using this test method demonstrate the marked improvement in flexibility in irradiated specimens having a low melt index. The retention of flexibility in specimens aged a week before testing is particularly noteworthy at a melt index below one decigram per minute. Typical results are shown in the following table of data obtained on blends of 65% paraffin wax (Atlantic Refining Co. Wax No. 1116) and 35% ethylene-vinyl acetate copolymer. The flex lives shown are the averages of six tests each.

TABLE H

| Vinyl acetate, percent | Initial melt index, dg./min. | Radiation dose, megareps | Final melt index, dg./min. | Flex life cycles after aging 4 hours | Flex life cycles after aging 1 week |
|---|---|---|---|---|---|
| 28 | 26.2 | 0 | 26.2 | 42 | 21 |
| 25 | 20.6 | 0 | 20.6 | 62 | 31 |
| 25 | 17.4 | 0 | 17.4 | 92 | 58 |
| 29 | 13.4 | 0 | 13.4 | 163 | 47 |
| 28 | 5.7 | 0 | 5.7 | 504 | 284 |
| 25 | 2.14 | 0 | 2.14 | 555 | 303 |
| 25 | 17.4 | 0.765 | 1.90 | 546 | 339 |
| 29 | 13.4 | 0.78 | 1.04 | 629 | 378 |
| 29 | 13.4 | 0.85 | 0.78 | 684 | 381 |
| 25 | 17.4 | 1.28 | 0.75 | 671 | 409 |
| 25 | 17.4 | 1.38 | 0.49 | 734 | 451 |
| 29 | 13.4 | 1.14 | 0.43 | 793 | 536 |
| 25 | 17.4 | 1.60 | 0.30 | 1,083 | 696 |
| 28 | 5.7 | 0.75 | 0.77 | 1,024 | 774 |
| 25 | 2.14 | 0.50 | 0.74 | 841 | 724 |

It has also been observed that these wax-copolymer blends have superior hot-tack properties of such mixtures that result only when the copolymer is made according to this invention. These unusual results with paraffin wax blends with these irradiated copolymers can be secured with compositions containing as low as 0.05 part by weight of irradiated copolymer per part of wax and more preferably from 0.2 part to 1 part of copolymer per part by weight of wax seems to give optimum results.

The physical properties mentioned herein were measured by the following test methods:

(Ultimate) tensile strength—ASTM–D–412–51T
Percent elongation—ASTM–D–412–51T
Melt index—ASTM–D–1238–57T, measurements at 190° C.
Secant modulus—ASTM–D–638 except that test specimens were cut by die A of ASTM–D–412. Strain point determined from stress-strain plot of automatic recorder calculated as 100 times the ratio of pounds load at 1% strain to the arithmetic product of average width and average thickness in inches.

What is claimed is:

1. A composition of paraffin wax blended with ethylene-vinyl acetate copolymer comprising:
    (a) one part of paraffin wax and
    (b) from 0.05 to 1 part of a substantially completely thermoplastic irradiated ethylene-vinyl acetate copolymer having a melt index of less than 5 decigrams per minute at 190° C. and being completely soluble in hot toluene, said copolymer having been produced by exposing a copolymer containing 15 to 35% vinyl acetate and having a melt index above 5 decigrams per minute at 190° C. to high energy ionizing radiation of a dosage between 0.5 and 1.5 megareps sufficient to reduce the melt index below 5 decigrams per minute at 190° C. but insufficient to cross-link the said copolymer.

2. A composition of paraffin wax blended with ethylene-vinyl acetate copolymer comprising:
    (a) one part of paraffin wax and
    (b) from 0.2 to 1 part of a substantially completely thermoplastic irradiated ethylene-vinyl acetate copolymer having a melt index of less than 5 decigrams per minute at 190° C. and being completely soluble in hot toluene, said copolymer having been produced by exposing a copolymer containing between 20% and 30% vinyl acetate and having a melt index above 5 decigrams per minute at 190° C. to high energy ionizing radiation of a dosage sufficient to reduce the melt index of the copolymer to within a range of 0.1 to 3 decigrams per minute at 190° C. but insufficient to cross-link the said copolymer.

References Cited

UNITED STATES PATENTS

| | | | |
|---|---|---|---|
| 2,877,196 | 4/1959 | Reding | 260—28.5 |
| 3,160,575 | 12/1964 | Bartl et al. | 204—159.14 |
| 3,274,086 | 9/1966 | Potts | 204—159.14 |

MORRIS LIEBMAN, Primary Examiner
S. L. FOX, Assistant Examiner

U.S. Cl. X.R.

204—159.14